US007542228B2

(12) United States Patent
Knigge et al.

(10) Patent No.: US 7,542,228 B2

(45) Date of Patent: Jun. 2, 2009

(54) FRICTIONAL HEAT ASSISTED RECORDING

(75) Inventors: Bernhard Knigge, San Jose, CA (US); Jia-Yang Juang, Santa Clara, CA (US); Erhard Schreck, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/899,003

(22) Filed: Aug. 30, 2007

(65) Prior Publication Data

US 2009/0059410 A1 Mar. 5, 2009

(51) Int. Cl.
*G11B 21/02* (2006.01)

(52) U.S. Cl. .......................................................... 360/75

(58) Field of Classification Search ...................... None
See application file for complete search history.

(56) References Cited

U.S. PATENT DOCUMENTS 4,599,658 A * 7/1986 Saitoh et al. .................. 360/59
4,773,060 A 9/1988 Shimada et al.
4,819,091 A 4/1989 Brezoczky et al.
5,305,165 A * 4/1994 Brezoczky et al. ....... 360/246.2
5,825,591 A * 10/1998 Nakamura et al. ....... 360/234.1
6,392,832 B1 5/2002 Oshiki et al.
6,433,310 B1 * 8/2002 Wickramasinghe et al. . 219/216
6,441,982 B1 8/2002 Fukushima et al.
6,950,267 B1 * 9/2005 Liu et al. ...................... 360/75
6,982,843 B2 1/2006 Coffey et al.
7,130,141 B2 * 10/2006 Chey et al. .................... 360/59
7,154,696 B2 * 12/2006 Nikitin et al. ................. 360/75
7,224,547 B2 * 5/2007 Suk ............................ 360/75

FOREIGN PATENT DOCUMENTS

| | | |
|---|---|---|
| JP | 61077181 | 4/1986 |
| JP | 62212979 | 9/1987 |
| JP | 62239395 | 10/1987 |
| JP | 5081847 | 4/1993 |
| JP | 6044502 | 2/1994 |
| JP | 7244801 | 9/1995 |
| JP | 2001057010 | 2/2001 |
| JP | 2002197742 | 7/2002 |
| JP | 2005158170 | 6/2005 |

OTHER PUBLICATIONS

Yeack-Scranton, et al., "An Active Slider For Practical Contact Recording", *IEEE Transactions on Magnetics*, vol. 26, No. 5, (Sep. 1990),2478-2483.

(Continued)

*Primary Examiner*—K. Wong

(57) ABSTRACT

In a method for writing data to a disk drive, a selected portion of a surface of a rotating disk of the disk drive is contacted with a designated contact region of a slider. An aspect of the contact is controlled to regulate frictional heating of the selected portion such that a magnetic field required to write data to the selected portion is reduced to a level which permits writing of data in the selected portion. Data is written on a frictionally heated track in the selected portion.

21 Claims, 8 Drawing Sheets

200
127
125
130
205
215
DISK 157
225
CONTACT CONTROLLER 250
MOTOR-HUB ASSEMBLY 140
VELOCITY CONTROL MODULE 260
THERMAL FLY-HEIGHT CONTROLLER 273
ELECTROSTATIC FLY-HEIGHT CONTROLLER 275
BOUNCE CONTROLLER 277
TEMPERATURE INFORMATION 280
CONTACT FORCE CONTROL MODULE 270

OTHER PUBLICATIONS

IP COM, et al., "Solution to Poor Data Write at Low Temperatures in Magnetic Data Storage Systems", *IP COM Disclosure*, (Jun. 12, 2003),1-1.

Man, et al., "Mapping of Slider-Disk Interaction", *IEEE Transactions on Magnetics*, vol. 38, No. 5, (Sep. 2002),2120-2122.

IP COM, et al., "Long Life (Contact) Recording Head", IP.com, (2004),1-2.

Peng, et al., "Thermo-Magneto-Machanical Analysis of Head-Disk Interface in Heat Assisted Magnetic Recording", *Tribiology International*, (Jun. 2005),588-593.

Itoh, et al., "An experimental investigation for continuous contact recording technology", *IEEE Transactions on Magnetics*, vol. 37, No. 4, (Jul. 2001),1806-1808.

* cited by examiner

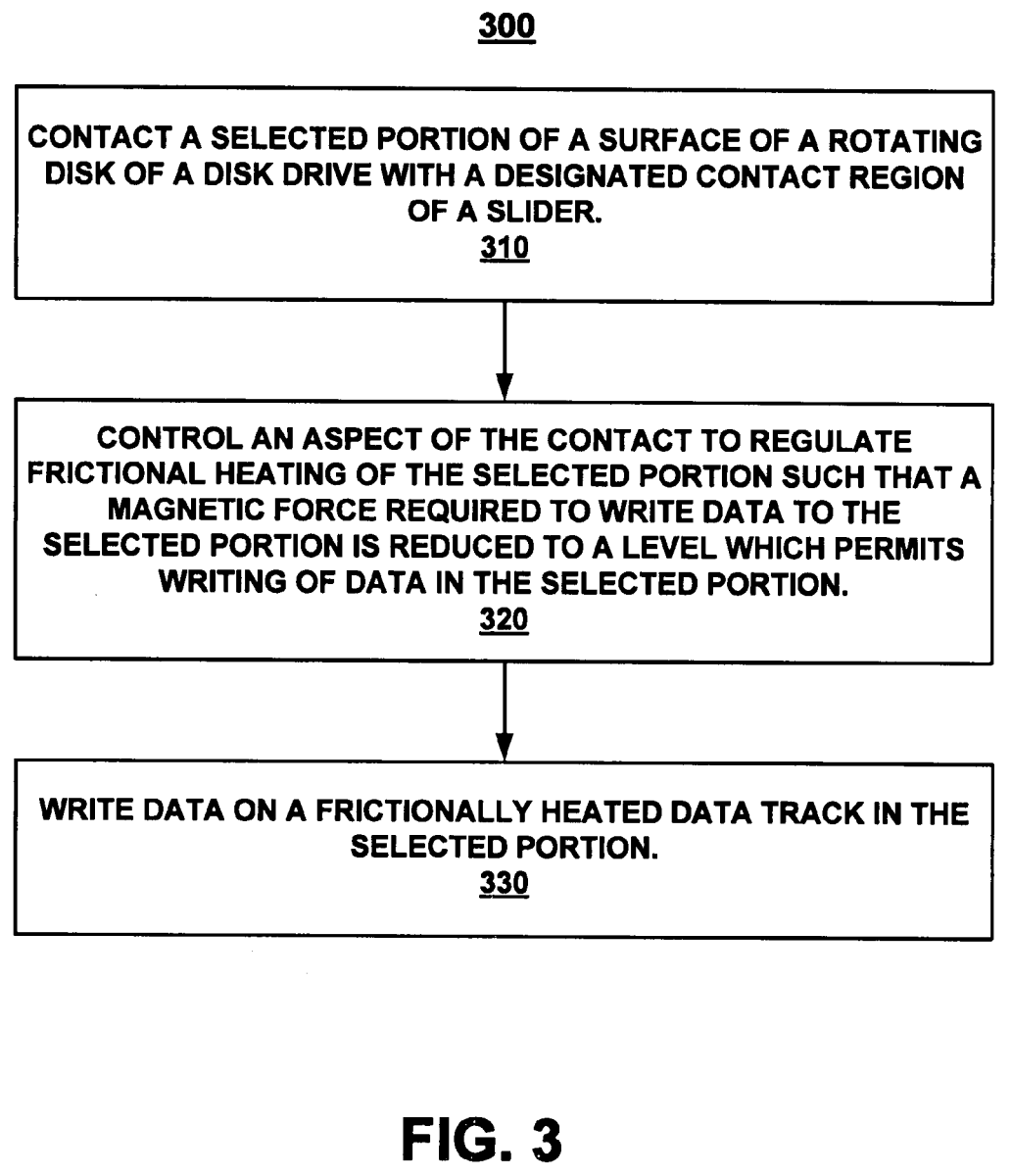

300

CONTACT A SELECTED PORTION OF A SURFACE OF A ROTATING DISK OF A DISK DRIVE WITH A DESIGNATED CONTACT REGION OF A SLIDER.
310

CONTROL AN ASPECT OF THE CONTACT TO REGULATE FRICTIONAL HEATING OF THE SELECTED PORTION SUCH THAT A MAGNETIC FORCE REQUIRED TO WRITE DATA TO THE SELECTED PORTION IS REDUCED TO A LEVEL WHICH PERMITS WRITING OF DATA IN THE SELECTED PORTION.
320

WRITE DATA ON A FRICTIONALLY HEATED DATA TRACK IN THE SELECTED PORTION.
330

FIG. 3

FRICTIONAL HEAT ASSISTED RECORDING

TECHNICAL FIELD

Embodiments of the present technology relate generally to the field of direct access storage devices and in particular to thermal assisted recording.

BACKGROUND

Direct access storage devices (DASD), commonly known as hard drives or hard disk drives (HDDs), have become part of every day life, and as such, expectations and demands continually increase for greater speed for manipulating data and for holding larger amounts of data.

Operating temperatures can limit the performance of an HDD, and if not compensated for in some manner can render an HDD inoperable. In particular, cold operating temperatures increase the coercive force of the magnetic medium and thus the magnetic field needed in order for the write head to write data to the magnetic medium. Cold enough temperatures often cause this coercive force to increase beyond the capabilities of the write head of the HDD. An example of such a cold operating temperature is an HDD in an extreme temperature environment of −30° C. Though cold temperatures are extreme, they may commonly be experienced on cold winter days, such as, for example, within an HDD installed in an automobile navigation system. At cold operating temperatures, it is often required to heat the magnetic medium to a higher temperature so that the magnetic field required of the write head for writing data is reduced to a level which the write head of the HDD can produce.

In other instances, a room temperature magnetic medium may be purposely chosen with a high coercive force, as a design choice, so that a high magnetic field is required to change the magnetization of the magnetic medium storing the data. Such a design allows for higher areal density and more magnetically stable storage of data. However, such a design may offer similar problems experienced with a cold medium. For example, even at room temperature, the magnetic field required of the write head for writing data to the magnetic medium may, by design, be higher than the write head of an HDD is able to produce. As with cold temperatures, heating the magnetic medium to a higher temperature is a strategy by which the coercivity of the magnetic medium may be lowered in order to reduce the magnetic field required of the write head for writing data to a level which the write head of the HDD can produce.

Various methods and systems for heating magnetic media are known or theorized, with most being complex, inefficient, difficult, and/or expensive to implement. An example of an often recited method is the use of a laser to direct energy onto a track or region of a disk in order to heat the medium just prior to the writing of data. While this method is functional, it is complicated and relatively expensive to implement such laser heating in an HDD. Moreover, lasers are typically inefficient, and thus consume a large amount of power in order to perform such heating. Such power consumption is not desirable in many environments, such as, for example, in mobile devices which operate on battery power. Another method for heating magnetic medium of an HDD is simply heating the entire HDD, however, this is not energy efficient and is generally slow (possibly taking a minute or longer), thus delaying a user's use of the HDD.

SUMMARY

In a method for writing data to a disk drive, a selected portion of a surface of a rotating disk of the disk drive is contacted with a designated contact region of a slider. An aspect of the contact is controlled to regulate frictional heating of the selected portion such that a magnetic field required to write data to the selected portion is reduced to a level which permits writing of data in the selected portion. Data is written on a frictionally heated track in the selected portion.

BRIEF DESCRIPTION OF THE DRAWINGS

The accompanying drawings, which are incorporated in and form a part of this specification, illustrate embodiments of the presented technology for frictional heat assisted recording and, together with the description, serve to explain the principles of the presented technology:

FIG. 3 shows a flow diagram of an example method for writing data in disk drive, in accordance with an embodiment.

Figure 1:
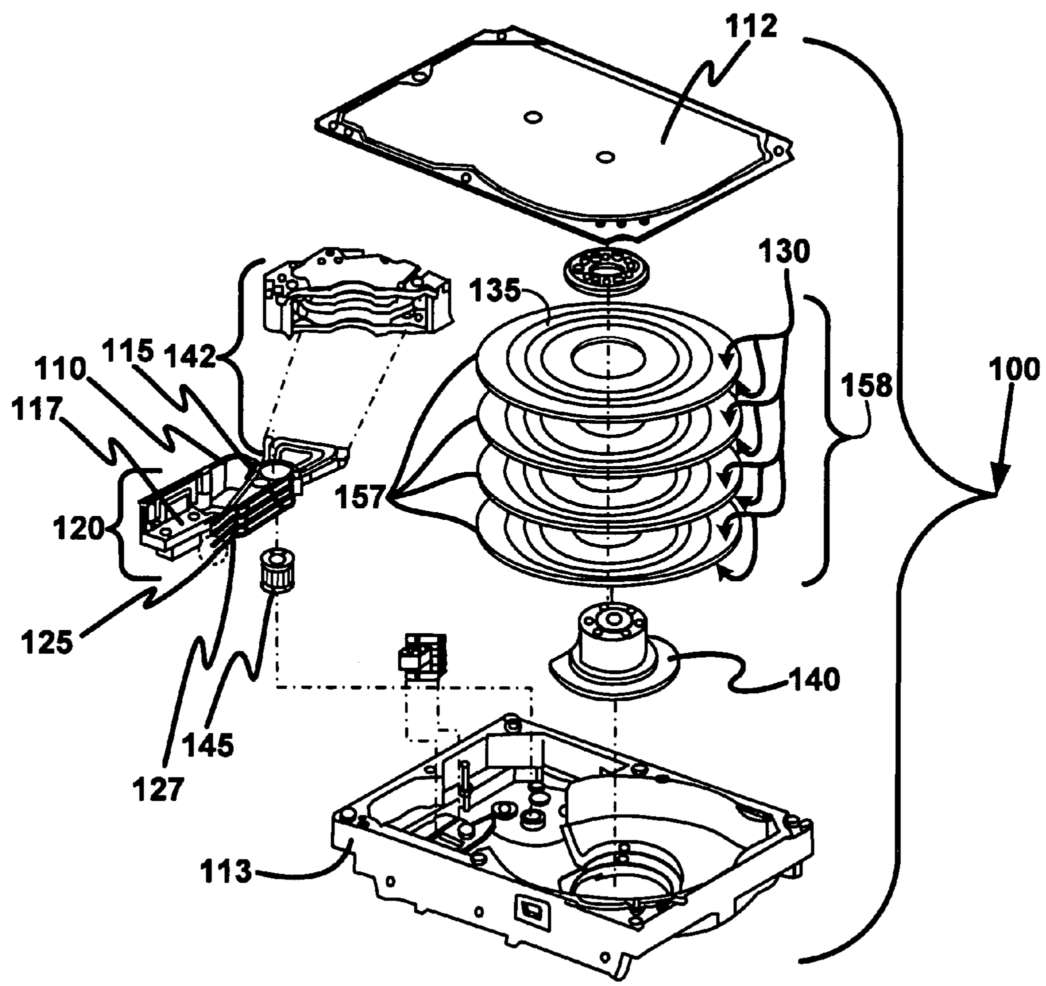
FIG. 1 is an isometric blow-apart of a Hard Disk Drive (HDD) in accordance with an embodiment of the present technology.

The drawings referred to in this description should not be understood as being drawn to scale unless specifically noted.

DETAILED DESCRIPTION

Reference will now be made in detail to the alternative embodiments of the present technology. While numerous specific embodiments of the present technology will be described in conjunction with the alternative embodiments, it will be understood that they are not intended to limit the present technology to these embodiments. On the contrary, these described embodiments of the present technology are intended to cover alternatives, modifications and equivalents, which may be included within the spirit and scope of the embodiments as defined by the appended claims.

Furthermore, in the following detailed description, numerous specific details are set forth in order to provide a thorough understanding of the present technology.

However, it will be recognized by one of ordinary skill in the art that embodiments may be practiced without these specific details. In other instances, well known methods, procedures, components, and circuits have not been described in detail as not to unnecessarily obscure aspects of embodiments of the present technology.

Overview of Discussion

Embodiments of the present technology provide mechanisms and methods for frictional heat assisted recording in a hard disk drive. Through use of the present technology, the coercivity of a selected portion of the magnetic medium may be lowered, thus lowering the magnetic field required to write data on the magnetic medium of a disk in a hard disk drive (HDD). This is useful for reducing the magnetic field required to write data to HDDs which have been designed with a magnetic medium which requires a high magnetic field to write data (e.g., a magnetic field which is higher than a write head of the HDD is capable of producing). It is also useful, for example, in environmental conditions, where a low temperature causes the magnetic field required to write data to a disk to rise to a level which is higher than a write head of the HDD is capable of producing (for example due to an increase of coercive force of the magnetic medium due to decrease in temperature).

Moreover, the frictional heat assisted recording of the present technology is operable using techniques to control mechanical components that already exist or may soon exist in many HDDs. Thus, very little, if any, mechanical complexity is added to an HDD in order to utilize techniques of frictional heat assisted recording that are described herein. This leads to ease in manufacturing and lower costs, as compared to more complex methods of thermal assisted recording which employ separate heat sources, such as a laser. Moreover, very little additional power is required to implement the techniques of frictional heat assisted recording of the present technology. Thus applications which have a scarcity of power, such as battery powered devices, may implement an embodiment of the present technology without a large power drain which would be associated with a heating method such as the use of a laser or the heating of an entire HDD.

The discussion of the present technology will begin with a brief description of components and operation of an example hard disk drive. A block diagram of components of an example mechanism for frictional heat assisted recording in a hard disk drive will then be generally described. The mechanism will be further described in conjunction with description of a method for writing data in a hard disk drive. In conjunction with the description of the method, an example diagram of a frictionally heated disk will be presented. Finally, several graphs describing frictional heating, contact conditions, and responses will be presented in order to further the understanding of the present technology.

Example Hard Disk Drive

With reference to FIG. 1, an isometric blow-apart of HDD 100 is shown in accordance with an embodiment of the present technology. Base casting 113 provides coupling points for components and sub-assemblies such as disk stack 158, voice coil motor (VCM) 142, and actuator assembly 120. Disk stack 158 is coupled to base casting 113 by means of motor-hub assembly 140. Motor-hub assembly 140 will have at least one disk 157 coupled to it whereby disk 157 can rotate about an axis common to motor-hub assembly 140 and the center of disk 157. Disk 157 has at least one disk surface 130 upon which reside data tracks 135. Disk 157 has an associated coercivity (coercive force) which is temperature dependent (e.g the magnetic field needed for a write head to write to the magnetic-recording medium of disk 157 increases when the temperature of disk 157 decreases, and decreases when the temperature of disk 157 increases). Actuator assembly 120 comprises suspension 127, which suspends hard disk drive slider 125 next to disk surface 130, and connector 117, which conveys data between arm electronics (A/E) 115 and a host system wherein HDD 100 resides. Flex cable 110, which is part of actuator assembly 120, conveys data between connector 117 and A/E 115.

Actuator assembly 120 is coupled pivotally to base casting 113 by means of pivot bearing 145, whereby VCM 142 can move HDD slider 125 arcuately across data tracks 135 in an accurate manner. Upon assembly of actuator assembly 120, disk stack 158, VCM 142, and other components with base casting 113, cover 112 is coupled to base casting 113 to enclose these components and sub-assemblies into HDD 100.

Mechanism for Frictional Heat Assisted Recording

Figure 2:
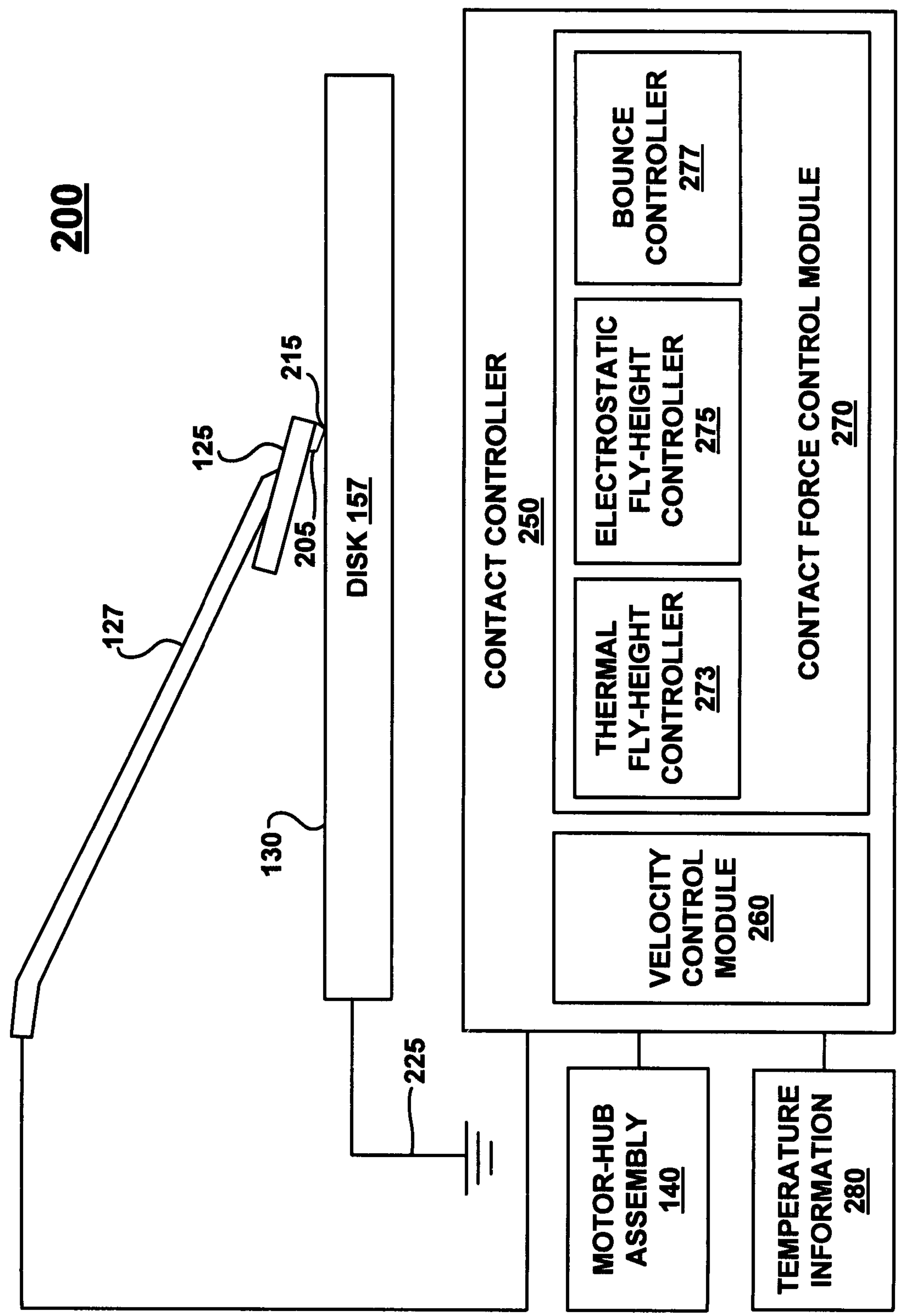
FIG. 2 is block diagram of components of an example mechanism for frictional heat assisted recording in an HDD, in accordance with an embodiment.

FIG. 2 is block diagram of components of an example mechanism 200 for frictional heat assisted recording in a hard disk drive, such as HDD 100, in accordance with an embodiment. Mechanism 200 is comprised of a contact controller 250 which is coupled with a slider 125 that includes a designated contact region 205. Slider 125 also comprises a magnetic transducer located generally in designated contact region 205. The magnetic transducer comprises a magnetoresistive element (read head) and an inductive element (write head). The read head is used for reading of data from one or more tracks 135 on disk surface 130 and the write head is used for writing of data to one or more tracks 135 on disk surface 130. Slider 125 is coupled via suspension 127 and arm electronics 115 (not shown in FIG. 2) to contact controller 250.

Contact controller 250 operates to cause designated contact region 205 to contact disk surface 130 of disk 157 while disk 157 is rotating. The contact occurs on a selected portion 215 of disk surface 130 which contains one or more data tracks 135 (see e.g., FIGS. 1 and 4). As a result of the contact, the data track(s) 135 are frictionally heated to reduce the magnetic field required to write data. As will be further described, in one embodiment, this enables a write head of HDD 100 to write data to data track(s) 135 whereas, prior to the frictional heating, the write-head magnetic field was incapable of overcoming the high coercivity of the disk medium in order to write data to the disk.

Selected portion 215 is "selected" by normal disk drive operation as a region in which data needs to be written. However, in some instances, due to design or extreme cold the magnetic field required to write data in selected portion 215 is higher than the capability of a write head of slider 125.

Designated contact region 205 is shown at an enlarged size for purposes of illustration. It is appreciated that in one embodiment, designated contact region 205 is a portion of a trailing edge pad of slider 125. In one embodiment, designated contact region 205 also comprises or is a magnetoresistive (MR) element (read head) and an inductive element (write head), of slider 125. In some embodiments, where thermal fly-height control (TFC) is used, designated region 205 is a bump of a thermal protrusion that protrudes from slider 125 in response to voltage applied to a TFC heater coil of slider 125. An example of a technique for using a thermal protrusion to enabling contact between a slider and a disk is described in detail in detail in U.S. patent application Ser. No. 11/646,794, "Enabling intermittent contact recording on-demand," by Knigge et al., entitled filed Dec. 27, 2006, which is assigned to the assignee of the present application.

Contact controller 250 is comprised of one or more of a velocity control module 260 and a contact force control module 270, each of which are used to control aspects of the frictional force generated by contact between designated contact region 205 and selected portion 215. Contact controller 250 actively controls one or more aspects of contacting of disk surface 130 to regulate frictional heating of selected portion 215 such that a magnetic force required to write data to selected portion 215 is reduced to a level which permits writing of data on one or more data tracks 135 in selected portion 215.

In some embodiments, as shown in FIG. 2, contact controller 250 is also coupled with motor-hub assembly 140. This coupling allows contact controller 250 to measure changes in motor current which are caused by increased friction due to contact between designated contact region 205 and disk surface 130 of disk 157. In some embodiments, information regarding changes in motor current is coupled to contact controller 250 from a source other than motor-hub assembly 140.

It is appreciated that motor current to motor-hub assembly 140 increases during contact between designated contact region 205 and disk surface 130. This is because the frictional drag of contact force acts to slow the rotational speed of disk 157. To compensate and maintain a constant speed of rotation, motor current is increased to overcome the drag caused by the contact. Through measurement of motor current changes, contact controller 250 determines when contact between designated contact region 205 and disk surface 130 is occurring, and during contact, the amount of frictional contact force and corresponding heat that are generated on selected portion 215.

Velocity control module 260, when included, monitors and controls the rotational velocity of disk 157 to affect the generation of a particular amount of frictional heat during contact between designated contact region 205 and selected portion 215. Thus, in one embodiment, velocity control module 260 acts through the coupling between contact controller 250 and motor-hub assembly 140 to control the velocity of rotation of disk 157 during contact. By varying rotational velocity of disk 157, velocity control module 260 controls of the amount of heat generated by contact on selected portion 215. For example, by speeding up the rotation of disk 157 during contact, frictional heating is increased on selected portion 215. Likewise, by slowing down the speed of rotation during contact, frictional heating is decreased on selected portion 215. If the rotational velocity of disk 157 is altered during writing of data to a data track 135 in the frictionally heated selected portion 215, it is appreciated that compensation will need to be made during read back of such data. For instance, read back of such data may need to be performed at the same rotational disk velocity at which the data was written.

Contact force control module 270 actively controls one or more aspects of the contact force with which designated contact region 205 contacts selected portion 215 of disk surface 130. Contact force control module 270 is comprised of one or more of, thermal fly-height controller 273, electrostatic fly-height controller 275, and bounce controller 277.

Thermal fly-height controller 273 operates to control fly-height and contact between slider 125 and disk surface 130, when slider 125 is in close proximity (within several nanometers) to disk surface 130. When flying in such close proximity, and contact is desired, thermal fly-height controller 273 issues an appropriate voltage to a thermal heater coil of slider 125. This voltage causes a thermal protrusion to bulge toward disk surface 130 from designated contact region 205.

With appropriate application of voltage, which may be pulsed or comprise a waveform, thermal fly-height controller 273 causes the thermal protrusion to grow in a predictable manner until it contacts and pushes into disk surface 130. Thermal fly-height controller 273 controls this voltage, and hence the thermal protrusion, to both initiate contact and to imitate liftoff. Through control of this voltage, thermal fly-height control also selects and regulates contact force that is applied to disk surface 130 in selected portion 215. Examples of the type of thermal fly-height control performed by thermal fly-height controller 273 to initiate contact between a slider and a disk surface are described in detail in U.S. patent application Ser. No. 11/646,794, "Enabling intermittent contact recording on-demand," by Knigge et al., filed Dec. 27, 2006, and assigned to the assignee of the present application. Through such active contact force control, thermal fly-height controller 273 of contact force control module 270 ensures generation of a desired amount of frictional heat during contact between designated contact region 205 and selected portion 215.

Electrostatic fly-height controller 275 operates to actively control fly-height and contact of slider 125. In an embodiment where active electrostatic fly-height controller 275 is used, disk 157 is coupled with ground 225. Additionally, the body of slider 125 is isolated from ground, such as through application of a polyimide film layer to cover a flexure tongue of slider 125. In some embodiments, the body of slider 125 is also electrically isolated from suspension 127 in a similar manner. Electrostatic fly-height controller 275 determines the fly-height of slider 125 above disk surface 130. Absolute fly-height determination can be accomplished by inducing a slider 125 to disk surface 130 contact to obtain a reference. Slider and disk act as a capacitor that can only attract each other with applied voltages. So with increased voltages (negative or positive voltages) the flying height decreases. This is described in detail in U.S. Pat. No. 7,119,979, "Measurement of slider clearance by inducing collision of the slider with disk surface" by Walton Fong et al., and assigned to the assignee of the present application.

Electrostatic fly-height controller 275 similarly induces contact between designated contact region 205 and disk surface 130 by applying an appropriate signal. Likewise, electrostatic fly-height controller 275 also controls the contact force of the contact between designated contact region 205 and disk surface 130 by applying an appropriate signal. It is appreciated that other methods of electrostatic fly-height control may also be used to induce and control frictional contact between designated contact region 205 and selected portion 215 of disk surface 130. Through such active control, electrostatic fly-height controller 275 of contact force control module 270 ensures generation of a desired amount of frictional heat during contact between designated contact region 205 and selected portion 215.

When contact occurs between designated contact region 205 and selected portion 215, flying height variations can occur. However, flying height variations can be measured from the analysis of the strength of the MR read-back signal, and from the measurement of capacitance between slider 125 and disk 157. These flying height variations can be very large when in contact and may lead to slider bouncing vibrations.

Bounce controller 277 operates to actively dampen bounce vibrations. The dampened vibrations are generally those that occur due to contact and those that occur in the air-bearing range of the slider (such as vibrations which occur at frequencies between 200 kHz and 700 kHz and in particular pitch two mode vibrations at around 250 kHz). In an embodiment where bounce controller 277 is used, disk 157 is coupled with ground 225. Additionally, the body of slider 125 is isolated from ground, such as through application of a polyimide film layer to cover a flexure tongue of slider 125. In some embodiments, the body of slider 125 is also electrically isolated from suspension 127 in a similar manner. Bounce controller 277 measures or receives a measurement of vibrations of slider 125. This vibration measurement can be accomplished in numerous ways, including: measurement of vibrations with a laser Doppler velocimeter (LDV), measurement of acoustic emissions, analysis of fluctuations of the MR read-back signal, and analysis of fluctuations in a capacitance between slider 125 and disk 157. Many of these techniques are described in detail in patent application Ser. No. 11/647,970, "Closed-loop control of slider fly height," by Toshiki Hirano et al., filed Dec. 29, 2006 and assigned to the assignee of the present application.

Once vibrations of slider 125 are determined, bounce controller 277 creates and applies an appropriate signal to the body of slider 125 to actively cancel these vibrations. For example, a vibration signal is measured, filtered through a bandpass filter to capture vibrations such as those particular to air bearing range vibrations (e.g., between 200 kHz and 700 kHz). The filtered signal is then amplified and, if necessary phase shifted (for example to compensate by a phase shift caused by filtering). The amplified signal is then applied to slider 125 where it actively cancels out vibration. It is appreciated that such active damping of vibration also has the effect of causing an active stiffening of slider 125. One example of the type of active dampening performed by bounce controller 277 to reduce slider vibrations is described in detail in U.S. Pat. No. 7,193,806, "Feedback control mechanism for active damping of slider air bearing vibrations in a hard disk drive slider" and U.S. Pat. No. 7,215,500, "Feedback control mechanism for active damping of slider air bearing vibrations in a hard disk drive slider", both by Albrecht et al. and assigned to the assignee of the present application. It is appreciated that other methods of active damping may also be used to reduce bounce vibrations of slider 125. Through such active control of bounce vibration, contact force control module 270 reduces bounce vibration to ensure uniform application of contact force. This assures stability and predictability of frictional heat generation during contact between designated contact region 205 and selected portion 215.

In some embodiments, contact controller 250 receives temperature information 280 regarding the ambient temperature or the temperature of a portion of HDD 100. This can comprise a coupling to a temperature sensing device or receiving signal or measurement which can be interpreted as a temperature. For example, the HDD temperature can be estimated from the resistance value of the MR element of slider 125 if the temperature coefficient of resistance (TCR) of the MR element is known (from prior calibrations) and has small variations. Other such resistance measurements can also be used to determine temperature within HDD 100. For example, the temperature can similarly be determined by measurement of the resistance of a write coil or heater coil element included in slider 125.

In one embodiment, through analysis of such temperature information, contact controller 250 determines whether the temperature of a magnetic-recording medium in an HDD, such as HDD 100, is in a sufficiently cold temperature range to require employing frictional heat assisted recording in order to reduce a coercive force of the magnetic medium and thus reduce the magnetic field required of a write head of HDD 100 to write data to a disk of HDD 100. For example, in one embodiment, when temperature information 280 indicates a temperature of HDD 100 to be at or below 5° C., contact controller 250 operates to frictionally heat a selected portion 215 of disk surface 130 prior to writing of data to data track(s) 135 within selected portion 215. Similarly, in this example, when temperature information 280 indicates a temperature of HDD 100 to be above 5° C. contact controller 250 does not engage in frictional heat assisted recording, and HDD 100 operates normally (e.g., does not preheat a selected portion 215 before writing data to a track 135 within selected portion 215). Other temperature breakpoints for initiating frictional heat assisted recording are possible and anticipated.

Example Method for Writing Data in a Disk Drive

FIG. 3 shows a flow diagram 300 of an example method for writing data in a disk drive, in accordance with an embodiment. In the description of the elements of flow diagram 300, reference will be made to components and elements shown in FIG. 1, FIG. 2, and FIG. 4.

Although specific steps are disclosed in flow diagram 300, such steps are examples. That is, embodiments of the present technology are well suited to performing various other steps or variations of the steps recited in flow diagram 300. It is appreciated that the steps in flow diagram 300 may be performed in an order different than presented, and that not all of the steps in flow diagram 300 may be performed. Additionally, all of, or a portion of, the methods described by flow diagram 300 may be implemented using computer-readable and computer-executable instructions which reside, for example, in computer-usable media of a computer system, HDD, or like device. For example, such instructions may reside in or be embodied in a random access memory (RAM), read only memory (ROM), or application specific integrated circuit (ASIC) associated with HDD 100 of FIG. 1.

At 310 of flow diagram 300, in one embodiment, a selected portion of a surface of a rotating disk of a hard disk drive is contacted with a designated contact region of a slider. With reference to FIG. 2, in one embodiment, this comprises contact controller 250 causing designated contact region 205 to come into contact with selected portion 215 of disk surface 130. As described above, designated contact region 205 may comprise a thermally induced protrusion from slider 125. Also as described above, designated contact region 205 may comprise a trailing edge pad of the air bearing surface of slider 125. In either instance, designated contact region 205 may also comprise all or a portion of the read and/or write heads of slider 125. In some embodiments, the selected portion is only contacted if temperature information indicates that the magnetic-recording medium of the disk is or may be at or below a pre-determined temperature.

At 320 of flow diagram 300, in one embodiment, an aspect of the contact is controlled to regulate frictional heating of the selected portion such that a magnetic field required to write data to the selected portion is reduced to a level which permits writing of data in the selected portion. That is to say, coercivity of the recording medium in the selected portion is reduced to a level permitting the writing of data in the selected portion by the magnetic field produced by the write head of a particular HDD such as HDD 100. For example, in one embodiment, such regulated frictional heating enables a write head of a hard drive, such as HDD 100, to write data to the magnetic-recording medium. That is, if the write head was previously not capable of producing a magnetic field sufficiently strong to write data to the selected portion, the frictional heating temporarily lowers the coercive force of the selected portion to a point (or into a range) where the same magnetic field produced by the write head has sufficient strength to write data to one or more data tracks in the selected portion.

In some embodiments, at 320 of flow diagram 300, this can comprise controlling a rotational velocity of the disk being contacted in order to regulate frictional heating of the selected portion of the surface during the contacting. In one embodiment, for example, velocity control module 260 of contact controller 250 regulates the rotational velocity of the disk being contacted.

In some embodiments, at 320 of flow diagram 300, this comprises controlling bounce induced vibration of the contacting via use of a high damping slider such that the contacting is smoothed. The high damping may be as a result of active damping or as a result of passive damping obtained through the slider air bearing design. This controls a vibration aspect of the contact force of the contacting, thus adding stability and predictability to the generation of frictional heat during contact with the surface of the disk being contacted.

In some embodiments, at 320 of flow diagram 300, this comprises controlling an aspect of the contact force of the contact to regulate frictional heating of the selected portion of the surface of the disk being contacted. In one embodiment, contact force control module 270 of contact controller 250 regulates the force of contact. For example, in one embodiment as described in conjunction with FIG. 2, this comprises thermal fly-height controller 273 controlling the contact force via thermal fly-height control (e.g., controlling a thermally induced protrusion in designated contact region 205). In one embodiment, as described in conjunction with FIG. 2, this comprises electrostatic fly-height controller 275 actively controlling the contact force via electrostatic active control of the fly-height of slider 125. In one embodiment, as described in conjunction with FIG. 2, this comprises bounce controller 277 actively dampening bounce vibration sensed or measured in slider 125 in order to stabilize the contact force and thus stabilize the generation of frictional heat during contact with the surface of the disk being contacted. It is appreciated that these techniques for controlling contact force may be used alone or in combination with one another.

At 330 of flow diagram 300, in one embodiment, data is written on a frictionally heated data track in the selected portion. This comprises using a write head of slider 125 to write data to a data track within the frictionally heated selected portion of the disk. With reference to FIG. 2, it is appreciated that such writing may be performed while designated contact region 205 remains in contact with selected portion 215. It is also appreciated that slider 125 can come out of contact with disk surface 130 and that the data can be written to a data track 135 in the frictionally heated selected portion 215 prior to selected portion 215 cooling too much for the writing to be successful.

Figure 4:
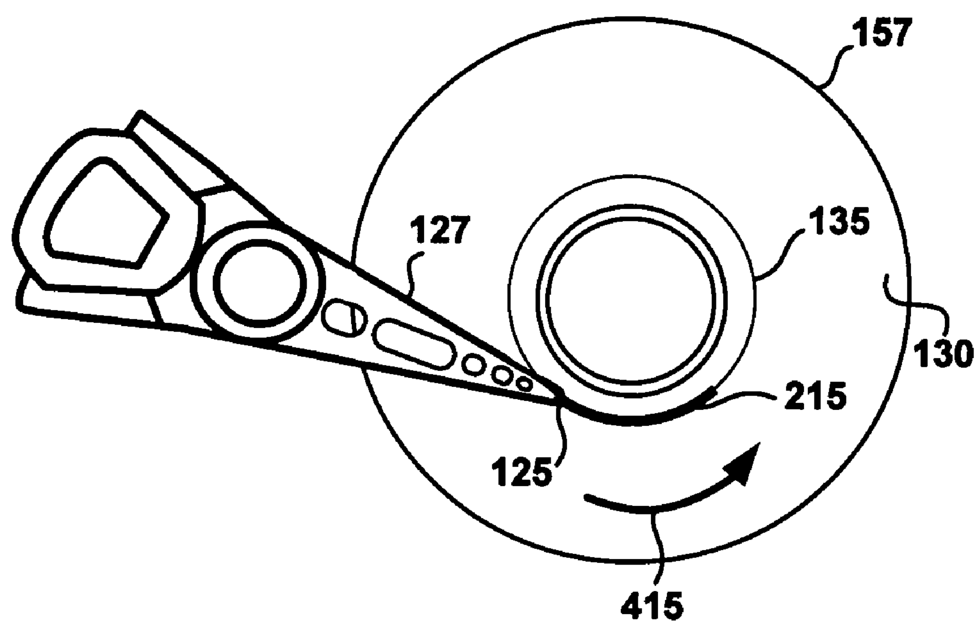
FIG. 4 is top view of a disk in which a selected portion has been frictionally heated, in accordance with an embodiment.

FIG. 4 is top view of a disk 157 of HDD 100, in which a selected portion 215 has been frictionally heated, in accordance with an embodiment. Arrow 415 indicates a direction of rotation of disk 157. In one embodiment, HDD 100 (FIG. 1) is coupled with a vehicle such as an automobile, truck, or a piece of construction or farm equipment (e.g., a dozer, earthmover, grader, tractor or the like). In one such embodiment, for example, HDD 100 is a portion of a navigation system of the vehicle. In a cold environment, such as –30° C., the magnetic field needed to write data to a magnetic medium of a particular embodiment of HDD 100 would have to overcome a disk coercivity of, for example, 5000 Oe (Oersted), while the write head of HDD 100 is only capable of producing a magnetic field capable of writing a disk with a coercivity of 4500 Oe. Thus, disk 157 has an associated coercivity (coercive force), which is temperature dependent. In such a situation, reading from HDD 100 may be possible, but recording to the HDD 100 is not possible. That is, a write head of HDD 100 is incapable of writing data to the magnetic medium of disk 157 (e.g., tracks 135 on disk surface 130) at the coercivity that is associated with disk 157. While this example instance of a mismatch between the magnetic-field capability of a write head and the magnetic field required to write to the magnetic medium of disk 157 has been described as due to cold temperature, it is appreciated that such an instance may occur due to a purposeful design choice of a magnetic-medium and write-head combination which is made during design of HDD 100.

With reference to the FIG. 2 and FIG. 3, contact is initiated between designated contact region 205 and selected portion 215 of disk surface 130. Through this contact, selected portion 215 is frictionally heated to a higher temperature which will allow writing data, with the write head, to one or more data tracks 135 in the selected portion. The frictional heat is generated by purposely and controllably contacting selected portion 215 to generate at least a required amount of heating to reduce the coercive force of the magnetic medium in selected portion 215 and thus the magnetic field required of the write head for writing data within the selected portion. In such a manner, the magnetic field required of the write head to write data in selected portion 215 is reduced to a level (or into a range) at which the write head of HDD 100 can write data. Via this frictional heating, the magnetic medium in selected portion 215 is controllably heated, for example, from –30° C. to 10° C. in a relatively short period of time. For example, as will be shown by graphical data described herein, such heating may be induced in 40 μs. However, it is appreciated that this time can vary up or down depending upon contact force, rotational disk speed, and other conditions.

The magnetic field required to write to the magnetic medium of selected portion 215 of disk surface 130 is reduced by approximately 15 Oe/° C. (this of course varies according to composition of the magnetic-recording medium). Thus, frictionally heated selected portion 215 now only requires a magnetic field sufficient to overcome a disk coercivity of 4400 Oe to write data. Since this is within the capability of the write head of HDD 100, it is now possible to write data to one or more data tracks 135 within the frictionally heated selected portion 215 of disk surface 130. As such, data is written to one or more data tracks 135 in selected portion 215.

Figure 5:
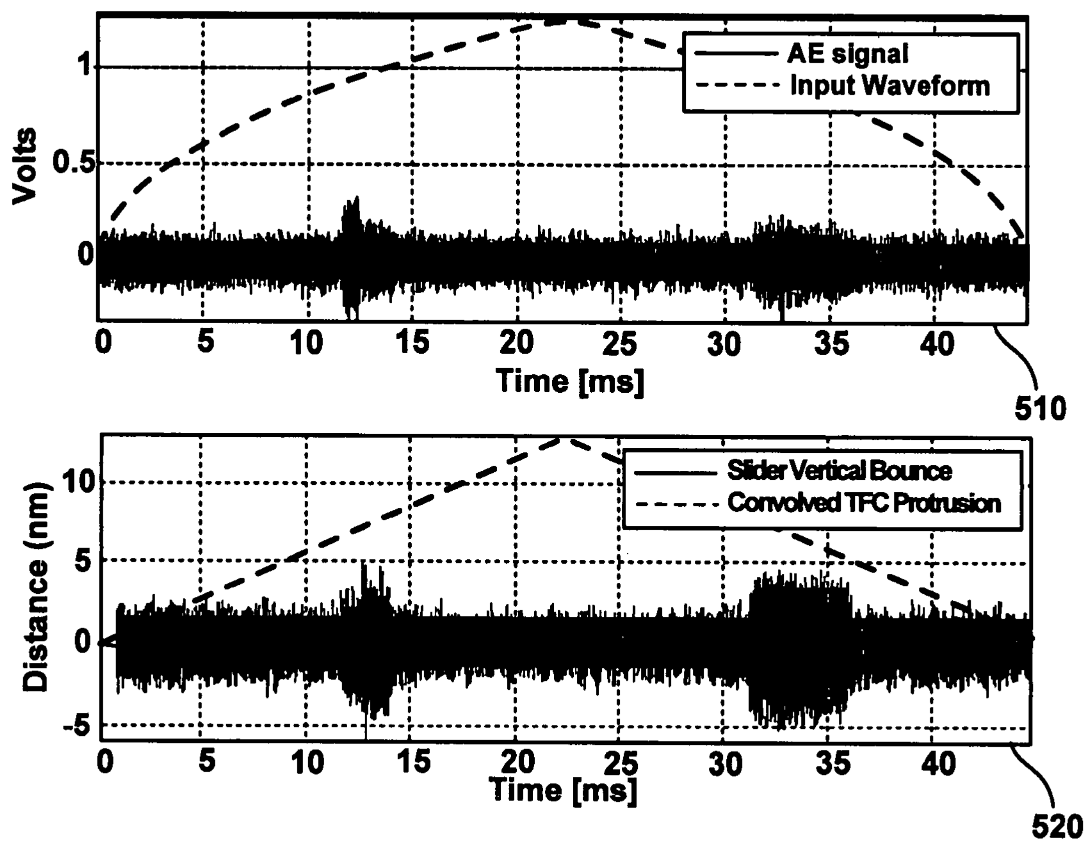
FIG. 5 demonstrates example information related to a disk contact initiated via thermal fly-height control, in accordance with an embodiment FIG. 6 demonstrates additional example information related to a disk contact initiated via thermal fly-height control, in accordance with an embodiment.

Graphical Representations of Information Related to Frictional Heat Assisted Recording FIG. 5 demonstrates an example of information related to disk contact initiated via thermal fly-height control (TFC), in accordance with one embodiment. Graphs 510 and 520 show data collected when a high damping slider (high damping may be achieved actively or passively) which utilizes TFC to control the contact force with the surface of a disk during contact for frictional heating. Graph 510 shows overlapping graphs of an input waveform to a TFC heater coil and an acoustic emission (indicative of bounce and/or contact). Graph 520 measures size change of a thermal protrusion as a result of the application of voltage to the TFC heater coil of a slider. This protrusion change measurement is superimposed over a graph of slider vertical bounce.

As can be seen, at approximately 0.8 volts, 7 nm of protrusion, and 12 ms of elapsed time, bouncing contact is achieved. Voltage is increased (thus increasing protrusion and contact force) and at approximately 1 volt, 9 nm of protrusion, and 14 ms of elapsed time, contact smoothes out. Even with increased voltage and greater protrusion, the high damping slider remains in smooth contact. The smooth sliding contact is maintained from approximately 14 ms elapsed time until approximately 31 ms of elapsed time. Bouncing vibrations return at 32 ms elapsed time when TFC heater coil voltage is lowered to initiate liftoff and the distance of the thermal protrusion lessens. Bouncing ceases at approximately 37 ms of elapsed time when slider liftoff occurs.

Graphs 510 and 520 demonstrate that with a suitable high damping slider, and sufficient contact force, smooth sliding contact can be obtained and maintained. Such smooth sliding contact facilitates uniform heating and reduced writing errors during the process of frictional heat assisted recording.

Figure 6:
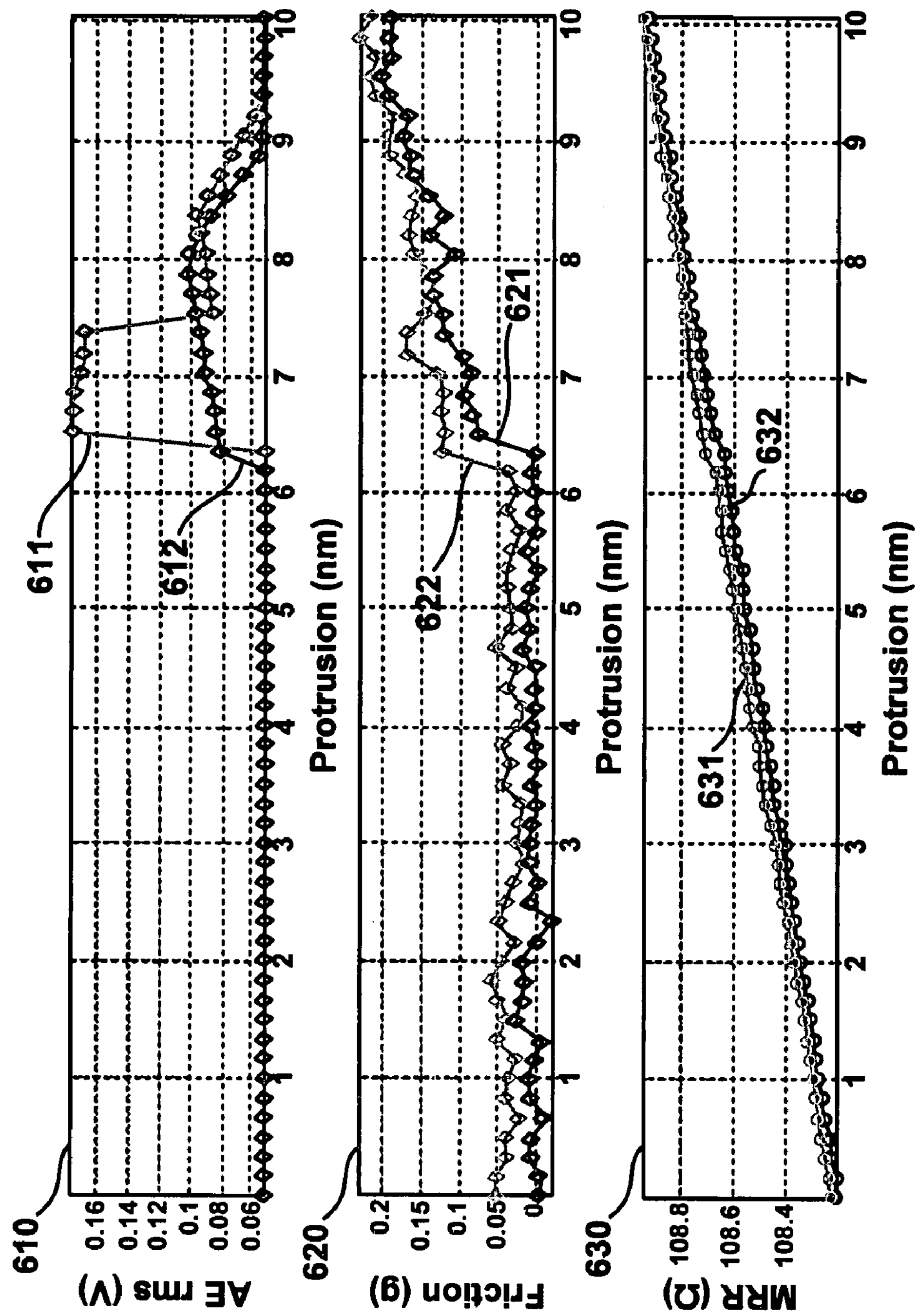

FIG. 6 demonstrates additional example information related to disk contact initiated via thermal fly-height control, in accordance with one embodiment. Data illustrated in graphs 610, 620 and 630 was obtained from a sample touch down and liftoff accomplished using thermal fly-height control and a slider with a high damping passive air bearing design. It is appreciated that graphs 610, 620, and 630 illustrate data collected concurrently from a single slider touching down and lifting off from a disk surface.

Some examples of sliders with high air bearing damping in and out of contact are described in detail in U.S. patent application Ser. No. 11/403,177, "Proximity recording slider with high air bearing damping in and out of contact," by Knigge et al., filed Apr. 11, 2006, which is assigned to the assignee of the present application. It is appreciated that other high damping air bearing designs are also suitable for use with the present technology. Examples of using thermal fly-height control (e.g. a thermal protrusion) to initiate contact between a slider and a disk surface are described in detail in U.S. patent application Ser. No. 11/646,794, "Enabling intermittent contact recording on-demand," by Knigge et al., filed Dec. 27, 2006, which is assigned to the assignee of the present application.

In graph 610, line 611 represents touch down and line 612 represents liftoff. In graph 620, line 621 represents touch down and line 622 represents liftoff. In graph 630, line 631 represents touch down and line 632 represents liftoff.

Graphs 610 and 620 show contact vibrations as measured by acoustic emission and the friction force between the slider and the disk surface. Bouncing begins to occur when sufficient voltage has been applied to a TFC heater coil to cause a thermal protrusion (of the write head for example) of approximately 6.5 nm. At this point, approximately 0.1 grams of tangential friction force between slider and disk is measured. Vibrations and bouncing cease and smooth sliding contact is achieved with a thermal protrusion of approximately 9.5 nm, which exerts a larger contact force and hence a larger tangential friction of approximately 0.2 grams. When voltage to the TFC heater coil is lessened to the point that the thermal protrusion shrinks back to approximately 9 nm, liftoff begins, and bouncing vibration occur. The bouncing vibration ceases at a thermal protrusion of approximately 6 nm, when liftoff occurs. Graphs 610 and 620 also show that the contact force applied to the disk can be increased by increasing the size of a thermal protrusion and decreased by decreasing the size of the thermal protrusion.

With reference to graph 630, the change in resistance of the magneto-resistive (MR) element of the slider is shown. As illustrated, the overall change in resistance due to TFC heating and contact friction is minimal when measured across the entire MR element. This is because the entire area of the MR element and slider dissipate the generated heat in a fairly efficient manner. It is appreciated, however, that this increase in heat is being generated by a small contacting patch with area of, for example, 5 μm×5 μm. Thus, the localized temperature increase in this contact area is much higher than would typically be calculated from the approximately 0.1 ohm variation seen at 6.5 nm protrusion. Even still, graph 630 illustrates that an overall change in the MR resistance does take place during contact events, and thus can be used as a scale to measure both the size of the thermal protrusion and contact force. Moreover, a translation table may be utilized to relate changes in MR resistance to localized temperature increase on the disk surface as a result of contact.

With respect to graph 620, as illustrated, 0.1 to 0.2 grams of force is applied when in contact. The friction can be measured from the change in the motor current. Increase in friction equals increased heat. Typically friction in a tangential direction to contact is slightly higher than friction in the normal direction. The normal force (contact force) equals the tangential force multiplied with the coefficient of friction (COF). The COF for typical slider disk interfaces is ranging from 0.5 to 0.8. Thus, when 0.2 grams of friction are measured in the tangential direction, the normal force is typically about half (or slightly more) than this (or approximately 0.1 grams). As such, roughly half the frictional value is from contact force applied by "pushing" into the disk surface with the designated contact region of the slider.

Figure 7A:
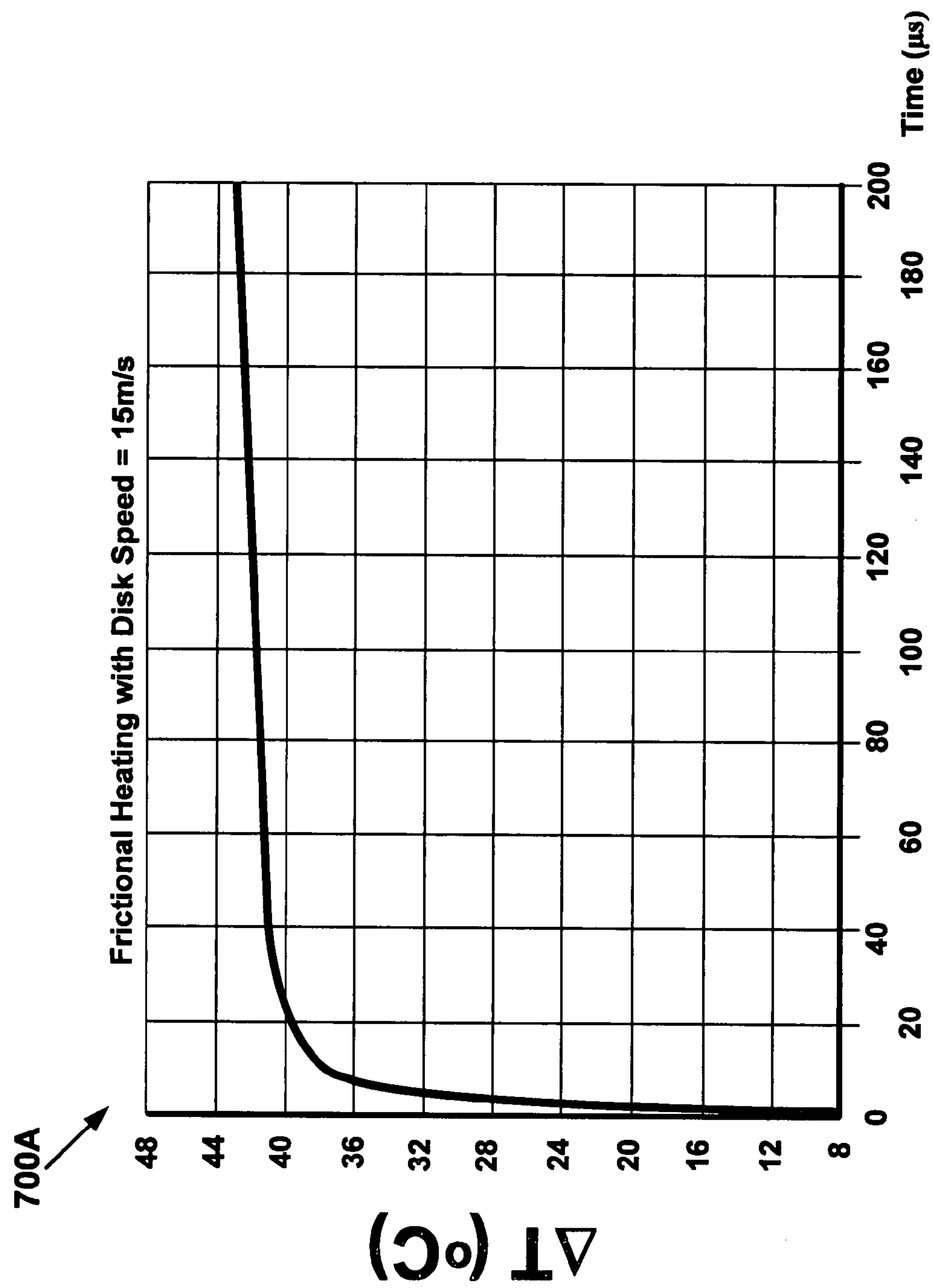
FIG. 7A demonstrates an example graph of frictional heat generated during contact with a disk which is rotating at 15 meters/second, in accordance with an embodiment.

FIG. 7A demonstrates an example graph 700A of frictional heat generated during contact with a disk which is rotating at 15 meters/second, in accordance with one embodiment. The information graphed in FIG. 7A was obtained under the following conditions: disk velocity of 15 m/s; alumina titanium carbide (ALTIC) slider; quartz disk; contact force of approximately 0.1 grams; and designated contact region of 5 μm×5 μm. Heating takes place very quickly, as demonstrated by the 41° C. change of temperature which occurs within 40 μS of contact being initiated. Accordingly, after only a small number of disk revolutions, such as 2-3, frictional heating of a selected portion of a disk surface stabilizes at approximately 43° C. higher than before contact was initiated. The information shown in FIG. 7A indicates that the frictional heating process is sufficiently quick and stable such that user will not likely be aware of any delay induced by selectively heating a selected portion of a disk prior to recording data in that selected portion. It is appreciated that a faster rotational velocity of a disk will cause an even greater change in temperature for a constant application of contact force. Likewise, it is appreciated that a slower disk rotational velocity will result in less temperature change for a constant application of contact force.

Figure 7B:
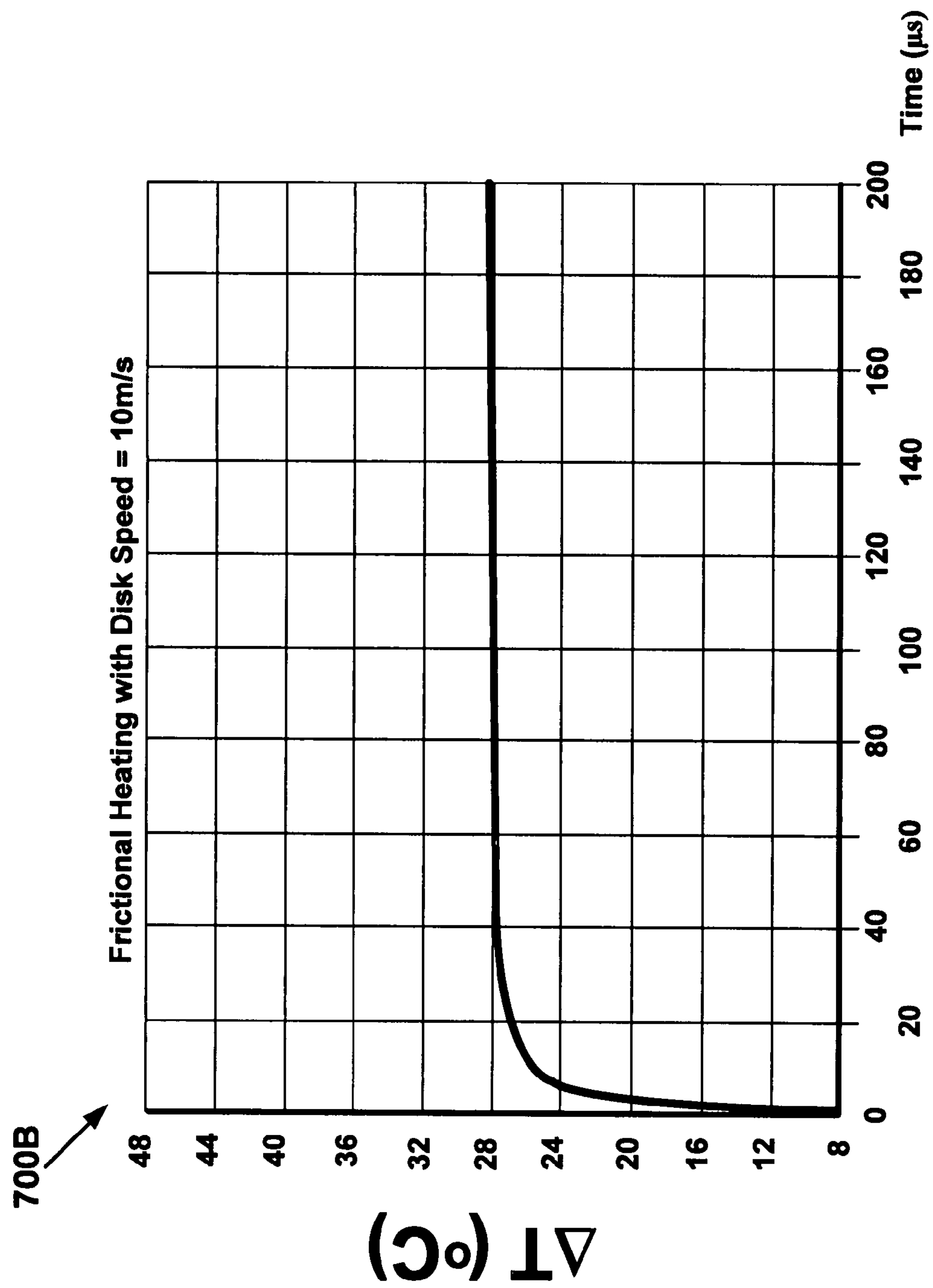
FIG. 7B demonstrates an example graph of frictional heat generated during contact with a disk which is rotating at 10 meters/second, in accordance with an embodiment.

FIG. 7B demonstrates an example graph 700B of frictional heat generated during contact with a disk which is rotating at 10 meters/second, in accordance with one embodiment. The information graphed in FIG. 7B was collected under the same conditions as utilized for information graphed in FIG. 7A, except that the rotational disk velocity has been slowed by 5 m/s. Even at a slower rotational velocity, frictional heating still takes place very quickly, as demonstrated by the approximately 27° C. change of temperature which occurs within 40 μS of contact being initiated. Additionally, after only a small number of disk revolutions, such as 2-3, frictional heating of a selected portion of a disk surface stabilizes at approximately 28° C. higher than before contact was initiated.

It is appreciated that a potential issue with frictional heat assisted recording is increased wear of the slider, and in particular the designated contact region of the slider. However, testing has shown that wear concerns are resolved with proper disk lubrication. Use of a lubricant additive, such as, for example X1P, has been shown to allow extensive contact with minimal to no measurable wear on a designated contact region of a slider. In an empirical published result a slider was placed into contact with a lubricated rotating disk surface (IEEE Transactions on Magnetics; Volume 37, Issue 4, Part 1, July 2001, Pages 1806-1808; “An experimental investigation for continuous contact recording technology;” by J. Itoh, Y. Sasaki, K. Higashi, H. Takami, and T. Shikanai). After two weeks of continuous contact with 0.1 g of contact force, it was noted that only 2 nm of wear took place on the designated contact region of the slider. It is estimated that this amount of contact time is sufficient for recording over two teraflops of data, which is more that will be typically recorded in the lifetime of most current HDDs. In embodiments of the present technology, frictional heat assisted recording is only used when recording (not when reading), and thus contact time is minimized. Further, in some embodiments, frictional heat assisted recording is only utilized when the magnetic medium of the HDD may be below a pre-determined temperature, thus further reducing the incidence of contact between a slider and a disk surface. Thus, through proper lubricant choice, it is anticipated that wear due to contact at the slider/disk interface will be reduced to a manageable amount over the expected life of an HDD.

In addition to causing friction and heat, contact can cause the generation of off-track and down-track direct current (dc) forces, which tend to impart lateral movement to the slider relative to the disk. However, such offset dc forces can be compensated for through servo control of the slider. Thus, through modification of the instructions used for controlling placement of the slider relative to a disk, such dc offset forces can be compensated for, such that the HDD can write and/or read despite potential off track interference.

The foregoing descriptions of example embodiments have been presented for purposes of illustration and description. They are not intended to be exhaustive or to limit the teaching to the precise forms disclosed. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for writing data in a disk drive, said method comprising:

contacting a selected portion of a surface of a rotating disk of said disk drive with a designated contact region of a slider;

controlling an aspect of said contacting to regulate frictional heating of said selected portion such that a magnetic field required to write data to said selected portion is reduced to a level which permits writing of data in said selected portion; and writing data on a frictionally heated data track in said selected portion.

2. The method as recited in claim 1, wherein said contacting a selected portion of a surface of a rotating disk of said disk drive with a designated contact region of a slider comprises:

contacting said selected portion of said surface of said rotating disk of said disk drive with a trailing edge pad of said slider.

3. The method as recited in claim 2, wherein said contacting said selected portion of said surface of said rotating disk of said disk drive with a trailing edge pad of said slider comprises:

contacting said selected portion of said surface of said rotating disk of said disk drive with a magneto-resistive element of said slider.

4. The method as recited in claim 1, wherein said controlling an aspect of said contacting to regulate frictional heating of said selected portion of said surface comprises:

controlling a contact force of said contacting to regulate frictional heating of said selected portion of said surface.

5. The method as recited in claim 4, wherein said controlling said contact force comprises:

controlling said contact force via thermal fly-height control.

6. The method as recited in claim 4, wherein said controlling said contact force comprises:

controlling said contact force via electrostatic fly-height control.

7. The method as recited in claim 1, wherein said controlling an aspect of said contacting to regulate frictional heating of said selected portion of said surface comprises:

controlling a rotational velocity of said rotating disk to regulate frictional heating of said selected portion of said surface during said contacting.

8. The method as recited in claim 1, wherein said controlling an aspect of said contacting to regulate frictional heating of said selected portion of said surface comprises:

controlling bounce induced vibration of said contacting via use of a high damping slider such that said contacting is smoothed.

9. A hard disk drive comprising:

a motor-hub assembly to which a disk is coupled for allowing rotation of said disk about an axis approximately perpendicular and centered to said disk, wherein said disk comprises a surface of data tracks;

a slider;

a designated contact region of said slider, said designated contact region for contacting a selected portion of said surface while said disk is rotating;

a contact controller for controlling an aspect of said contacting to regulate frictional heating of said selected portion such that a magnetic field required to write data to said selected portion is reduced to a level which permits writing of data in said selected portion; and a write head for writing data on a data track in said selected portion.

10. The hard disk drive of claim 9, wherein said designated contact region comprises:

a trailing edge pad of said slider.

11. The hard disk drive of claim 10, wherein said designated contact region comprises:

said write head.

12. The hard disk drive of claim 11, wherein said write head comprises:

a thermally adjustable protrusion for applying an adjustable contact force to said surface.

13. The hard disk drive of claim 9, wherein said contact controller comprises:

a contact force control module for controlling a contact force aspect of said contacting to regulate frictional heating of said selected portion of said surface.

14. The hard disk drive of claim 13, wherein said contact force control module comprises:

a thermal fly-height controller for adjusting said contact force aspect.

15. The hard disk drive of claim 13, wherein said contact force control module comprises:

an active electrostatic fly-height controller for adjusting said contact force aspect.

16. The hard disk drive of claim 9, wherein said contact controller comprises:

a velocity control module for controlling a rotational velocity of said disk to cause a desired frictional heating of said selected portion of said surface during said contacting.

17. The hard disk drive of claim 9, wherein said contact controller comprises:

a bounce controller for reducing vibrations of said slider during said contacting.

18. A mechanism for frictional heat assisted recording in a hard disk drive, said mechanism comprising:

means for contacting a selected portion of a surface of a rotating disk of said hard disk drive with a slider;

a means for controlling an aspect of said contacting to regulate frictional heating of said selected portion such that a magnetic field required to write data to said selected portion is reduced to a level which permits writing of data in said selected portion; and a means for writing data on a frictionally heated data track in said selected portion.

19. The mechanism of claim 18, further comprising:

a means for determining if a temperature of said hard disk drive is in a sufficiently cold temperature range to require employing said means for contacting and said means for controlling in order to reduce a magnetic field required to write data to said disk.

20. The mechanism of claim 18, wherein said hard disk drive is coupled with a vehicle.

21. A hard disk drive (HDD) comprising:

a disk with a coercivity;

a slider; and a write head, wherein the write head is incapable of writing to a medium of said disk at said coercivity; and a means within said HDD for causing a portion of said disk to be frictionally heated such that that said coercivity is lowered to a level at which said write head can write to a medium within said selected portion.

* * * * *